US012750713B2

(12) United States Patent
Liu et al.

(10) Patent No.: US 12,750,713 B2
(45) Date of Patent: Sep. 29, 2026

(54) RESOURCE MEASUREMENT RESTRICTION FOR BEAM MANAGEMENT

(71) Applicant: LENOVO (BEIJING) LIMITED, Beijing (CN)

(72) Inventors: Bingchao Liu, Beijing (CN); Chenxi Zhu, Fairfax, VA (US); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 321 days.

(21) Appl. No.: 18/571,525

(22) PCT Filed: Jun. 18, 2021

(86) PCT No.: PCT/CN2021/100832

§ 371 (c)(1),
(2) Date: Dec. 18, 2023

(87) PCT Pub. No.: WO2022/261923

PCT Pub. Date: Dec. 22, 2022

(65) Prior Publication Data

US 2024/0284227 A1 Aug. 22, 2024

(51) Int. Cl.
*H04W 24/10* (2009.01)
*H04L 5/00* (2006.01)

(52) U.S. Cl.
CPC .......... *H04W 24/10* (2013.01); *H04L 5/0098* (2013.01)

(58) Field of Classification Search
None
See application file for complete search history.

(56) References Cited

U.S. PATENT DOCUMENTS

| | | | | |
|---|---|---|---|---|
| 2018/0287682 | A1* | 10/2018 | Kwak | H04B 7/0695 |
| 2018/0375560 | A1* | 12/2018 | Wei | H04L 1/0026 |
| 2019/0089436 | A1* | 3/2019 | Wei | H04L 1/16 |
| 2019/0090227 | A1* | 3/2019 | Tsai | H04W 72/046 |
| 2019/0141546 | A1* | 5/2019 | Zhou | H04W 72/0453 |
| 2019/0207662 | A1* | 7/2019 | Zhou | H04B 7/0626 |
| 2019/0207737 | A1* | 7/2019 | Babaei | H04B 7/0632 |
| 2019/0215888 | A1* | 7/2019 | Cirik | H04B 7/0695 |
| 2021/0184824 | A1* | 6/2021 | Kwak | H04L 5/0082 |
| 2021/0258060 | A1* | 8/2021 | Gao | H04L 5/0057 |
| 2022/0085943 | A1* | 3/2022 | Zhu | H04W 56/0055 |

(Continued)

FOREIGN PATENT DOCUMENTS

CN 110475283 A 11/2019

OTHER PUBLICATIONS

PCT/CN2021/100832, "International Search Report and Written Opinion", International Searching Authority, Mar. 16, 2022, pp. 1-7.

(Continued)

*Primary Examiner* — Clemence S Han
(74) *Attorney, Agent, or Firm* — Kunzler Needham & Hilton

(57) ABSTRACT

Methods and apparatuses for resource measurement restriction for beam management are disclosed. A method comprises receiving a MAC CE to activate or deactivate resource (s) configured for the UE for channel measurement; and determining CRI or SSBRI values that are not allowed to be reported in a CSI report according to the resource (s) deactivated by the MAC CE.

20 Claims, 4 Drawing Sheets

(56) References Cited

U.S. PATENT DOCUMENTS

| | | | | |
|---|---|---|---|---|
| 2022/0094510 | A1* | 3/2022 | Zhang | H04L 5/0023 |
| 2022/0095254 | A1* | 3/2022 | Zhu | H04L 5/0094 |
| 2022/0109489 | A1* | 4/2022 | Zhu | H04W 80/02 |
| 2022/0110181 | A1* | 4/2022 | Miao | H04L 5/0023 |
| 2022/0140878 | A1* | 5/2022 | Zhu | H04B 7/0404 370/252 |
| 2022/0159417 | A1* | 5/2022 | Zhou | H04W 72/23 |
| 2022/0216904 | A1* | 7/2022 | Zhu | H04B 7/0695 |
| 2022/0239417 | A1* | 7/2022 | Cheng | H04L 1/1835 |
| 2022/0239423 | A1* | 7/2022 | Zhu | H04L 5/0023 |
| 2022/0322361 | A1* | 10/2022 | Zhu | H04W 72/23 |
| 2022/0360314 | A1* | 11/2022 | Zhu | H04B 7/0695 |
| 2023/0041095 | A1* | 2/2023 | Zhou | H04L 5/0057 |
| 2023/0379027 | A1* | 11/2023 | Chen | H04L 5/0057 |
| 2024/0237124 | A1* | 7/2024 | Matsumura | H04W 16/24 |

OTHER PUBLICATIONS

Huawei et al., "Independent and joint control of CSI-RS transmission and CSI reporting for NR MIMO", 3GPP TSG RAN WG1 # 88 Meeting R1-1701681, Feb. 13-17, 2017, pp. 1-7.

Huawei et al., "Alignment with RAN1 on handling of CSI reporting", 3GPP TSG-RAN WG2 Meeting 101 R2-1802210, Feb. 26-Mar. 3, 2018, pp. 1-6.

* cited by examiner

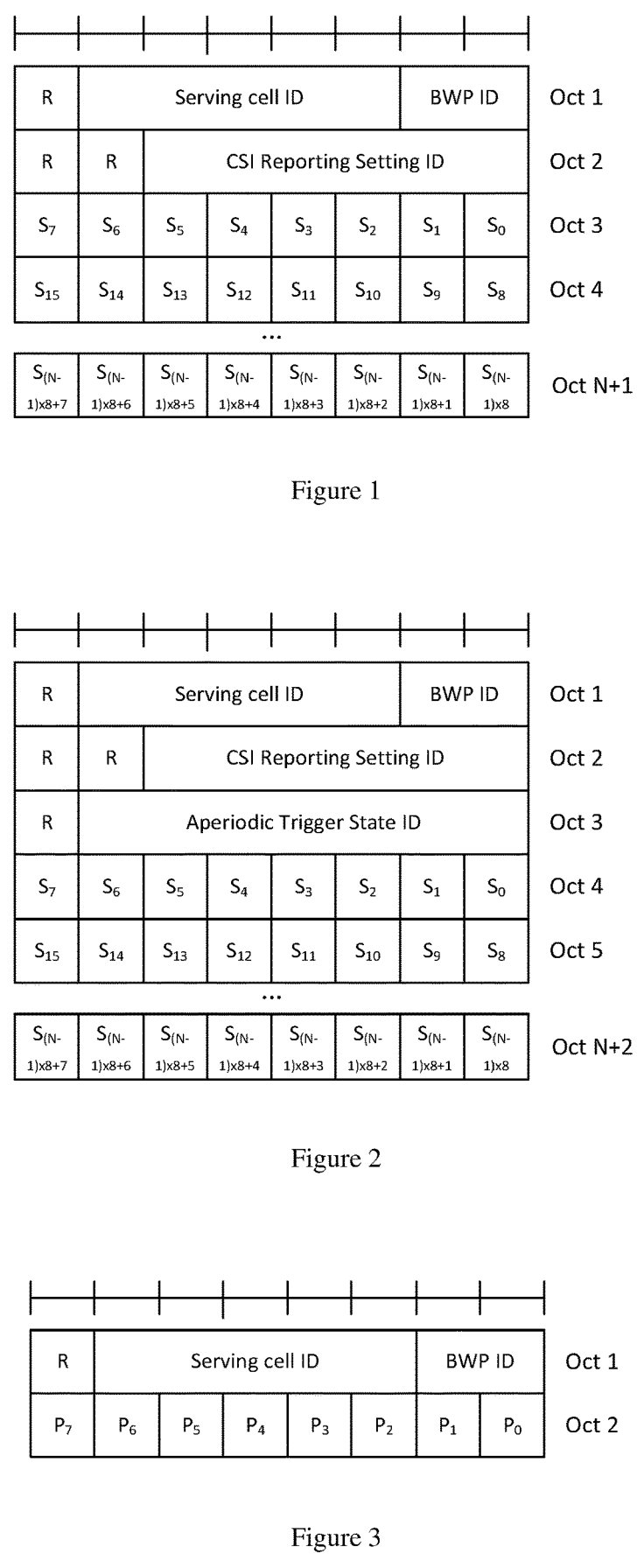

| | | | | | | | | |
|---|---|---|---|---|---|---|---|---|
| R | Serving cell ID | | | | | BWP ID | | Oct 1 |
| R | R | CSI Reporting Setting ID | | | | | | Oct 2 |
| $S_7$ | $S_6$ | $S_5$ | $S_4$ | $S_3$ | $S_2$ | $S_1$ | $S_0$ | Oct 3 |
| $S_{15}$ | $S_{14}$ | $S_{13}$ | $S_{12}$ | $S_{11}$ | $S_{10}$ | $S_9$ | $S_8$ | Oct 4 |
| | | | | … | | | | |
| $S_{(N-1)x8+7}$ | $S_{(N-1)x8+6}$ | $S_{(N-1)x8+5}$ | $S_{(N-1)x8+4}$ | $S_{(N-1)x8+3}$ | $S_{(N-1)x8+2}$ | $S_{(N-1)x8+1}$ | $S_{(N-1)x8}$ | Oct N+1 |

Figure 1

| | | | | | | | | |
|---|---|---|---|---|---|---|---|---|
| R | Serving cell ID | | | | | BWP ID | | Oct 1 |
| R | R | CSI Reporting Setting ID | | | | | | Oct 2 |
| R | Aperiodic Trigger State ID | | | | | | | Oct 3 |
| $S_7$ | $S_6$ | $S_5$ | $S_4$ | $S_3$ | $S_2$ | $S_1$ | $S_0$ | Oct 4 |
| $S_{15}$ | $S_{14}$ | $S_{13}$ | $S_{12}$ | $S_{11}$ | $S_{10}$ | $S_9$ | $S_8$ | Oct 5 |
| | | | | … | | | | |
| $S_{(N-1)x8+7}$ | $S_{(N-1)x8+6}$ | $S_{(N-1)x8+5}$ | $S_{(N-1)x8+4}$ | $S_{(N-1)x8+3}$ | $S_{(N-1)x8+2}$ | $S_{(N-1)x8+1}$ | $S_{(N-1)x8}$ | Oct N+2 |

Figure 2

| | | | | | | | | |
|---|---|---|---|---|---|---|---|---|
| R | Serving cell ID | | | | | BWP ID | | Oct 1 |
| $P_7$ | $P_6$ | $P_5$ | $P_4$ | $P_3$ | $P_2$ | $P_1$ | $P_0$ | Oct 2 |

Figure 3

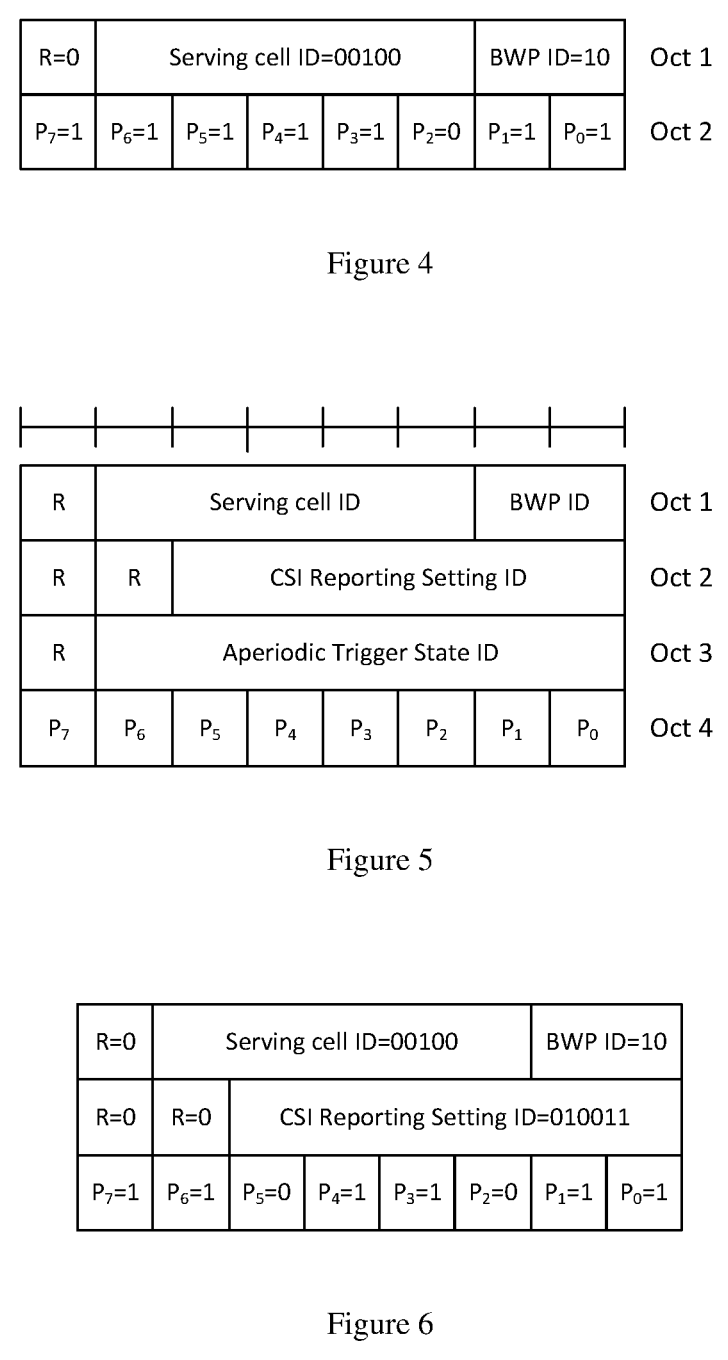

| | | | | | | | | |
|---|---|---|---|---|---|---|---|---|
| R=0 | Serving cell ID=00100 | | | | | BWP ID=10 | | Oct 1 |
| $P_7$=1 | $P_6$=1 | $P_5$=1 | $P_4$=1 | $P_3$=1 | $P_2$=0 | $P_1$=1 | $P_0$=1 | Oct 2 |

Figure 4

| | | | | | | | | |
|---|---|---|---|---|---|---|---|---|
| R | Serving cell ID | | | | | BWP ID | | Oct 1 |
| R | R | CSI Reporting Setting ID | | | | | | Oct 2 |
| R | Aperiodic Trigger State ID | | | | | | | Oct 3 |
| $P_7$ | $P_6$ | $P_5$ | $P_4$ | $P_3$ | $P_2$ | $P_1$ | $P_0$ | Oct 4 |

Figure 5

| | | | | | | | |
|---|---|---|---|---|---|---|---|
| R=0 | Serving cell ID=00100 | | | | | BWP ID=10 | |
| R=0 | R=0 | CSI Reporting Setting ID=010011 | | | | | |
| $P_7$=1 | $P_6$=1 | $P_5$=0 | $P_4$=1 | $P_3$=1 | $P_2$=0 | $P_1$=1 | $P_0$=1 |

Figure 6

| | | | | | | | | |
|---|---|---|---|---|---|---|---|---|
| R=0 | Serving cell ID=00100 | | | | | BWP ID=10 | | Oct 1 |
| R=0 | R=0 | CSI Reporting Setting ID=010011 | | | | | | Oct 2 |
| $S_7$=1 | $S_6$=1 | $S_5$=1 | $S_4$=1 | $S_3$=1 | $S_2$=1 | $S_1$=1 | $S_0$=1 | Oct 3 |
| $S_{15}$=1 | $S_{14}$=1 | $S_{13}$=1 | $S_{12}$=1 | $S_{11}$=0 | $S_{10}$=0 | $S_9$=0 | $S_8$=0 | Oct 4 |

RESOURCE MEASUREMENT RESTRICTION FOR BEAM MANAGEMENT

FIELD

The subject matter disclosed herein generally relates to wireless communications, and more particularly relates to methods and apparatuses for resource measurement restriction for beam management.

BACKGROUND

The following abbreviations are herewith defined, at least some of which are referred to within the following description: New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Evolved Node B (eNB), Next Generation Node B (gNB), Uplink (UL), Downlink (DL), Central Processing Unit (CPU), Graphics Processing Unit (GPU), Field Programmable Gate Array (FPGA), Orthogonal Frequency Division Multiplexing (OFDM), Radio Resource Control (RRC), User Entity/Equipment (Mobile Terminal), Transmitter (TX), Receiver (RX), Channel State Information (CSI), Channel State Information Reference Signal (CSI-RS), CSI-RS Resource Indicator (CRI), Synchronization Signal Block (SSB), SSB resource indicator (SSBRI), handover (HO), Reference Signal Receiving Power (RSRP), Layer 1 Reference Signal Received Power (L1-RSRP), channel measurement resource (CMR), non-zero power (NZP), physical cell identity (PCID), logical cell identity (LCID), Media Access Control (MAC), control element (CE), band width part (BWP), Signal to Interference and Noise Ratio (SINR), Layer 1 SINR (L1-SINR), precoding-matrix indicator (PMI), channel quality indicator (CQI), Information Element (IE), measurement objection (MO).

Traditional handover (HO) procedure for a UE moving across multiple cells specified in NR Release 15 is based on beam or cell measurement and report in RRC layer, which leads larger HO latency and larger signaling overhand. To reduce the latency and overhead, it was agreed that a UE can report one or more beams associated with one or more non-serving cells and the measured L1-RSRP values corresponding to the one or more beams in a CSI report in physical layer.

However, in some deployments, some RRC configured resources are not expected to be selected, for example, due to interference management or network optimization. In addition, a certain non-serving cell may not be applicable due to cell deployment. In view of the above, some resources do not need to be measured and cannot be selected to be reported. The restriction of the resources in NR Release 15 can be only achieved in RRC layer, which leads to larger latency and lower flexibility.

This disclosure targets MAC CE based measurement restriction on the beam measurement and reporting procedure.

BRIEF SUMMARY

Methods and apparatuses for resource measurement restriction for beam management are disclosed.

In one embodiment, a method comprises receiving a MAC CE to activate or deactivate resource(s) configured for the UE for channel measurement; and determining CRI or SSBRI values that are not allowed to be reported in a CSI report according to the resource(s) deactivated by the MAC CE.

In one embodiment, the MAC CE contains a CSI Reporting setting ID field indicating a CSI reporting setting for the CSI report, and the resources are configured in a resource setting for channel measurement associated with the CSI reporting setting for the CSI report. The MAC CE may further contain a bitmap to indicate the activation or deactivation status of the resources or resource sets or resource subsets configured in the resource setting for channel measurement. If one or more resource sets, each of which contains a plurality of resources, are configured in the resource setting for channel measurement for the CSI report that is a periodic or semi-persistent CSI report, each bit of the bitmap indicates the activation or deactivation status of a different resource within the one or more resource sets. The length of the bitmap is determined by the number of resources within the one or more resource sets. If multiple resource sets, each of which contains a plurality of resources, are configured in the resource setting for channel measurement for the CSI report that is an aperiodic CSI report, each bit indicates the activation or deactivation status for a different resource within one or more resource sets among the multiple resource sets; and the MAC CE further contains an Aperiodic Trigger State ID field indicating the one or more resource sets among the configured multiple resource sets for a certain aperiodic CSI report triggered by a certain CSI request value. The length of the bitmap is determined by the number of resources within the one or more resource sets. If multiple resource sets, each of which contains a plurality of resources, are configured in the resource setting for channel measurement, each bit of the bitmap indicates the activation or deactivation status of all resources within a different resource set. The length of the bitmap is determined by the number of the multiple resource sets. If one or more resource sets, each of which contains multiple subsets each of which contains a plurality of resources, are configured in the resource setting for channel measurement for the CSI report that is a periodic or semi-persistent CSI report, each bit of the bitmap indicates the activation or deactivation status of all resources within a different subset. The length of the bitmap is determined by the number of the subsets within the one or more resource sets. If multiple resource sets each of which contains multiple subsets each of which contains a plurality of resources are configured in the resource setting for channel measurement for the CSI report that is an aperiodic CSI report, each bit of the bitmap indicates the activation or deactivation status of all resources within a different subset within one or more resource sets among the multiple resource sets, and the MAC CE further contains an Aperiodic Trigger State ID field indicating the one or more resource sets. The length of the bitmap is determined by the number of the subsets within the one or more resource sets.

In another embodiment, the MAC CE contains a bitmap, and each bit of the bitmap indicates the activation or deactivation status of all resources associated with a different non-serving PCID. The MAC CE may further contain a CSI Reporting setting ID field indicating a CSI reporting setting for the CSI report, and the resources are configured in a resource setting for channel measurement associated with the CSI reporting setting for the CSI report.

In some embodiment, the resource(s) configured for the UE for interference measurement, each of which is one-by-one associated with one resource configured for the UE for channel measurement, are also activated or deactivated by the MAC CE. In some embodiment, the bit width of the reported CRI or SSBRI in the CSI report is determined by the smallest integer that is equal to or larger than $\log_2(K_{DS})$, in which $K_{DS}$ is the number of activated resources.

In one embodiment, a method comprises transmitting a MAC CE to activate or deactivate resource(s) configured for the UE for channel measurement; and determining CRI or SSBRI values that are not allowed to be reported in a CSI report according to the resource(s) deactivated by the MAC CE In another embodiment, a remote unit (UE) comprises a receiver that receives a MAC CE to activate or deactivate resource(s) configured for the UE for channel measurement; and a processor that determines CRI or SSBRI values that are not allowed to be reported in a CSI report according to the resource(s) deactivated by the MAC CE.

In yet another embodiment, a base unit comprises a transmitter that transmits a MAC CE to activate or deactivate resource(s) configured for the UE for channel measurement; and a processor that determines CRI or SSBRI values that are not allowed to be reported in a CSI report according to the resource(s) deactivated by the MAC CE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 1 illustrates an example of the MAC CE according to a first sub-embodiment of a first embodiment, a second embodiment, and a first sub-embodiment of a third embodiment;

FIG. 2 illustrates an example of the MAC CE according to a second sub-embodiment of the first embodiment, and a second sub-embodiment of the third embodiment;

FIG. 3 illustrates an example of the MAC CE according to a first sub-embodiment of a fourth embodiment;

FIG. 4 illustrates an MAC CE example according to the first sub-embodiment of the fourth embodiment;

FIG. 5 illustrates an example of the MAC CE according to a second sub-embodiment of the fourth embodiment;

FIG. 6 illustrates an MAC CE example according to the second sub-embodiment of the fourth embodiment;

DETAILED DESCRIPTION

Figures 7, 8:
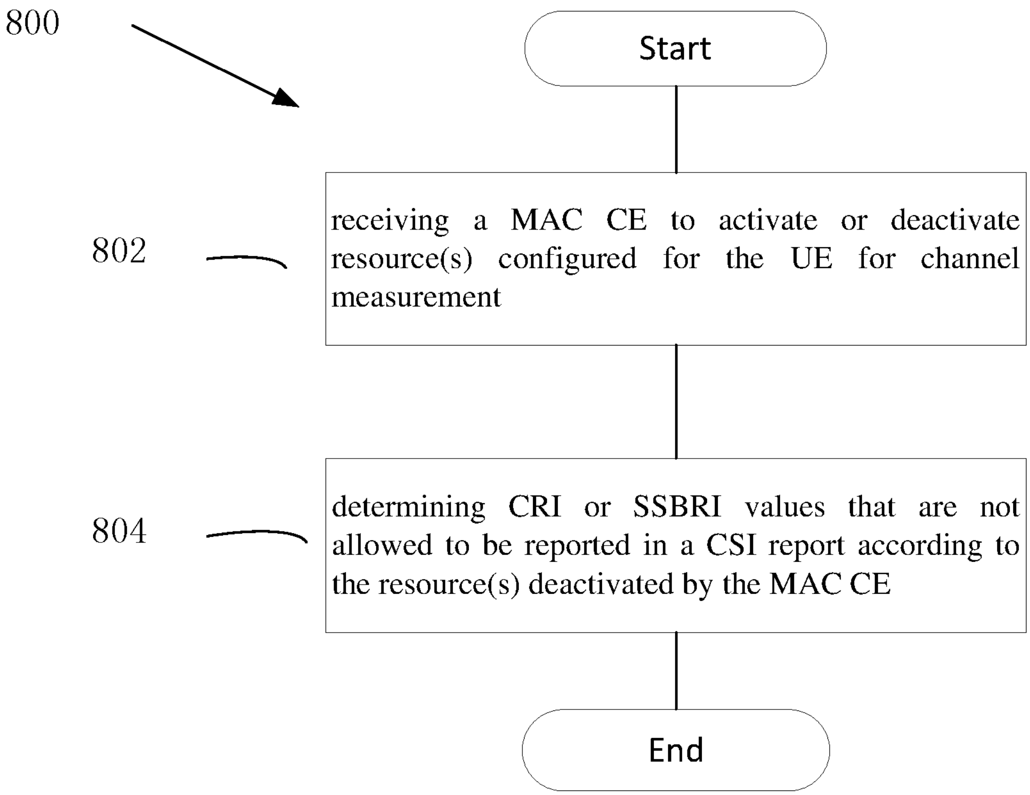
FIG. 7 illustrates an MAC CE example according to the first sub-embodiment of the first embodiment.
FIG. 8 is a schematic flow chart diagram illustrating an embodiment of a method.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

A resource setting, which is configured by a set of RRC parameters included in CSI-ResourceConfig IE, is used to configure resources and/or resource sets (each of which is composed of resources or resource subsets) and/or resource subsets (each of which is composed of resources) associated with a CSI reporting setting configured by a set of RRC parameters included in CSI-ReportConfig IE. The time domain behaviors of the resources within a resource setting are indicated by a RRC parameter resourceType that can be set to aperiodic, periodic, or semi-persistent. Each resource setting configured by CSI-ResourceConfig IE contains a configuration of a list of S (S is an integer that is equal to or more than 1, i.e. $S \geq 1$) resource sets, where the resource sets can be NZP CSI-RS resource sets or SS/PBCH block (SSB) sets. Each resource set can be a channel measurement resource set composed of channel measurement resources or an interference measurement resource set composed of interference measurement resources. Instead of being composed of resources, each resource set can be composed of a number of subsets where each subset is composed of resources. The number of resource sets configured in a periodic or semi-persistent resource setting is limited to S=1 in NR Release 16. In NR Release 17, the number of resource sets configured in a periodic or semi-persistent resource setting can be one or more (i.e. S≥1). On the other hand, the number of resource sets configured in an aperiodic resource setting can be 1 or more. Each resource may be associated with a PCID (e.g. associated with a PCID of a non-serving cell).

Depending on different configurations of the resource settings and/or resource sets, the present disclosure proposes different methods for the restriction of beam measurement and report. In particular, different MAC CE formats are proposed for the restriction of beam measurement and report. Each beam is represented by a resource, which may be a CSI-RS resource or a SSB resource. When a resource representing a beam is deactivated, the beam represented by the resource is restricted (i.e. not required to be measured and not allowed to be reported) in a CSI report associated with a CSI reporting setting.

According to the first embodiment, the restriction of beam measurement and report is performed per resource. In other words, the MAC CE according to the first embodiment indicates the activation or deactivation status per resource (e.g. per channel measurement resource), in which the activated channel measurement resource(s) can be measured and be allowed to be reported while the deactivated channel measurement resource(s) are not required to be measured and not allowed to be reported.

According to a first sub-embodiment of the first embodiment, it is assumed that a resource setting for channel measurement (e.g. for periodic and semi-persistent (SP) CSI report) includes one or more configured resource set(s) (e.g. NZP CSI-RS resource set(s) or SS/PBCH block (SSB) resource set(s)), each of which is composed of a plurality of channel measurement resources (e.g. NZP CSI-RS resources or SSB resources).

The MAC CE according to the first sub-embodiment of the first embodiment is illustrated in FIG. 1.

The MAC CE (also referred to as "Measurement Resource Activation/Deactivation for CSI report MAC CE") illustrated in FIG. 1 is identified by a MAC CE subhead with a dedicated LCID. It has a variable size and consists of the following fields:

- Serving Cell ID: This field indicates the identity of the Serving Cell for which the MAC CE applies. The length of the field is 5 bits;
- BWP ID: This field indicates a DL BWP for which the MAC CE applies. The length of the BWP ID field is 2 bits;
- CSI Reporting Setting ID: This field indicates the periodic or semi-persistent CSI Reporting Setting configured by the set of RRC parameters included in CSI-ReportConfig IE for which the MAC CE applies. The length of this field is 6 bits. The RRC parameter reportConfigType, which configures the type of a CSI report, for the indicated CSI-ReportConfig 1E is set to 'periodic', which identifies a periodic CSI report, or set to 'semiPersistentOnPUCCH' or 'semiPersistentOnPUSCH', which identifies a semi-persistent (SP) CSI report carried by PUCCH or carried by PUSCH. The RRC parameter reportQuantity, which configures the report content of this CSI report, for the indicated CSI-ReportConfig IE is set to for example 'cri-RSRP' or 'ssb-Index-RSRP', which means that one or more CRI(s) or SSBRI(s) and the measured L1-RSRP values of the NZP CSI-RS resource(s) or SSB resource(s) indicated by the one or more CRI(s) or SSBRI(s) are reported in the CSI report.

$S_i$: Each of $S_i$ field indicates the activation or deactivation status of the $(i+1)^{th}$ channel measurement resource in the channel measurement resource set(s) configured in the periodic or semi-persistent CSI Reporting Setting indicated by the CSI Reporting Setting ID field. When an $S_i$ field is set to 1 (or set to 0), the $(i+1)^{th}$ channel measurement resource (e.g. nap-CSI-RS-Resource or the csi-SSB-Resource) in the channel measurement resource set(s) (e.g. NZP-CSI-RS-ResourceSet(s) or CSI-SSB-ResourceSet(s)) configured in the periodic or semi-persistent CSI Reporting Setting indicated by the CSI Reporting Setting ID field is activated (e.g. when $S_i$ field is set to '1') or deactivated (e.g. when $S_i$ field is set to '0'). The deactivated channel measurement resource(s) (e.g. NZP CSI-RS resource(s) indicated by CRI(s) or SSB resource(s) indicated by SSBRI(s)) is/are not required to be measured and not allowed to be reported. All of the $S_i$ fields forms a bitmap. The length of the bitmap is determined by the number of resources within all channel measurement resource set(s) configured by RRC signaling.

That is, when the UE reports a CSI report according to a CSI reporting setting associated with a resource setting, if the MAC CE illustrated in FIG. 1 according to the first sub-embodiment of the first embodiment that includes the CSI Reporting Setting ID field indicating the CSI reporting setting was previously received, each of the deactivated resource(s) in the resource setting indicated by the $S_i$ field of the MAC CE is not required to be measured and not allowed to be reported. In other words, the CRI(s) or SSBRI(s) indicating the deactivated resource(s) are not allowed to be reported in the CSI report.

According to a second sub-embodiment of the first embodiment, it is assumed that a resource setting for channel measurement includes multiple channel measurement resource sets for aperiodic CSI report triggered by a certain CSI request value, each of which is composed of a plurality of channel measurement resources. One or more channel measurement resource sets can be selected by the aperiodic triggering state associated with the aperiodic CSI report.

The MAC CE according to the second sub-embodiment of the first embodiment is illustrated in FIG. 2.

The MAC CE illustrated in FIG. 2 differs from the MAC CE illustrated in FIG. 1 only in that an 'Aperiodic Trigger State ID' field is further included. Incidentally, the CSI Reporting Setting ID field in FIG. 2 indicates the aperiodic CSI Reporting Setting configured by the set of RRC parameters included in CSI-ReportConfig IE for which the MAC CE applies. The Aperiodic Trigger State ID field indicates the aperiodic triggering state associated with the aperiodic CSI Reporting Setting indicated by the CSI Reporting Setting ID field. The aperiodic triggering state indicates one or more channel measurement sets from the multiple channel measurement resource sets included in the aperiodic CSI Reporting Setting indicated by the CSI Reporting Setting ID field. So, the $S_i$ field indicates all of channel measurement resources within the one or more channel measurement sets indicated by the Aperiodic Trigger State ID field.

That is, when the UE reports a CSI report associated with an aperiodic triggering state according to a CSI reporting setting associated with a resource setting, if the MAC CE illustrated in FIG. 2 according to the second sub-embodiment of the first embodiment that includes the CSI Reporting Setting ID field indicating the CSI reporting setting and the Aperiodic Trigger State ID filed indicating the aperiodic triggering state was previously received, each of the deactivated resource(s) in the resource setting indicated by the $S_i$ field of the MAC CE is not required to be measured and not allowed to be reported in the CSI report.

According to a second embodiment, the restriction of beam measurement and report is performed per resource set. In other words, the MAC CE according to the second embodiment indicates the activation or deactivation status per resource set (e.g. per channel measurement resource set), in which all of channel measurement resources within the activated channel measurement resource set(s) can be measured and be allowed to be reported while all of channel measurement resources within the deactivated channel measurement resource set(s) are not required to be measured and not allowed to be reported.

According to the second embodiment, it is assumed that a resource setting for channel measurement (e.g. for aperiodic CSI report) includes multiple channel measurement resource sets, each of which is composed of a plurality of channel measurement resources.

The MAC CE according to the second embodiment is the same as that illustrated in FIG. 1, except that each $S_i$ field indicates the activation or deactivation status of all channel measurement resources within the $(i+1)^{th}$ channel measurement resource set (e.g. NZP CSI-RS resource set or SSB resource set) included in the resource setting for channel measurement indicated by CSI Report Setting ID field. The length of the bitmap of the $S_i$ fields is determined by the number of resource sets configured for the CSI reporting setting for periodic or SP CSI report or by the number of resource sets configured for the CSI reporting setting and associated with a certain aperiodic CSI trigger state ID.

That is, when the UE reports a CSI report according to a CSI reporting setting associated with a resource setting, if the MAC CE illustrated in FIG. 1 according to the second embodiment that includes the CSI Reporting Setting ID field indicating the CSI reporting setting was previously received, the channel measurement resources within each of the deactivated resource set(s) in the resource setting indicated by the $S_i$ field of the MAC CE are not required to be measured and not allowed to be reported. In other words, the CRI(s) or SSBRI(s) indicating the channel measurement resources within the deactivated resource set(s) are not allowed to be reported in the CSI report.

According to a third embodiment, the restriction of beam measurement and report is performed per subset. In other words, the MAC CE according to the third embodiment indicates the activation or deactivation status per subset, in which all of channel measurement resources within the activated channel measurement resource subset(s) can be measured and be allowed to be reported while all of channel measurement resources within the deactivated channel measurement resource subset(s) are not required to be measured and not allowed to be reported.

According to the third embodiment, it is assumed that a resource setting for channel measurement includes one or multiple channel measurement resource sets, each of which is composed of a plurality of subsets (i.e. channel measurement resource subsets), where each subset is composed of a plurality of channel measurement resources.

According a first sub-embodiment of the third embodiment, a resource setting for channel measurement includes one or more configured channel measurement resource sets each of which is composed of a plurality of subsets, where each subset is composed of a plurality of channel measurement resources.

The MAC CE according to the first sub-embodiment of the third embodiment is the same as that illustrated in FIG. 1, except that each $S_i$ field indicates the activation or deactivation status of all channel measurement resources within the $(i+1)^{th}$ subset in the resource set(s) configured in the resource setting for channel measurement indicated by CSI Report Setting ID field. The length of the bitmap of the $S_i$ fields is determined by the number of resource subsets in all resource sets configured for the indicated CSI reporting setting.

That is, when the UE reports a CSI report according to a CSI reporting setting associated with a resource setting, if the MAC CE illustrated in FIG. 1 according to the first sub-embodiment of the third embodiment that includes the CSI Reporting Setting ID field indicating the CSI reporting setting was previously received, the channel measurement resources within each of the deactivated subset(s) in the resource setting indicated by the $S_i$ field of the MAC CE are not required to be measured and not allowed to be reported. In other words, the CRI(s) or SSBRI(s) indicating the channel measurement resources within the deactivated subset(s) are not allowed to be reported in the CSI report.

According a second sub-embodiment of the third embodiment, a resource setting for channel measurement includes multiple resource sets each of which is composed of a plurality of subsets, where each subset is composed of a plurality of channel measurement resources.

The MAC CE according to the second sub-embodiment of the third embodiment is the same as that illustrated in FIG. 2, except that the $S_i$ field indicates the activation or deactivation status of all channel measurement resources within the $(i+1)^{th}$ subset within the channel measurement resource set(s) indicated by the 'Aperiodic Trigger State ID' field in the resource setting for channel measurement indicated by CSI Report Setting ID field. The length of the bitmap of the $S_i$ fields is determined by the number of resource subsets in the resource sets indicated by the 'Aperiodic Trigger State ID' field.

That is, when the UE reports a CSI report associated with an aperiodic triggering state according to a CSI reporting setting associated with a resource setting, if the MAC CE illustrated in FIG. 2 according to the second sub-embodiment of the third embodiment that includes the CSI Reporting Setting ID field indicating the CSI reporting setting and the Aperiodic Trigger State ID filed indicating the aperiodic triggering state was previously received, the channel measurement resources within each of the deactivated subset(s) (within the channel measurement resource set(s) indicated by the 'Aperiodic Trigger State ID' field in the resource setting) indicated by the $S_i$ field of the MAC CE are not required to be measured and not allowed to be reported. In other words, the CRI(s) or SSBRI(s) indicating the channel measurement resources within the deactivated subset(s) are not allowed to be reported in the CSI report.

For some cases, all beams within a certain cell may not be allowed to be reported, e.g. due to network overload. If the resources representing all beams within a certain cell belong to a resource set or belong to a subset, the restriction of beam measurement and report for beams within the certain cell(s) can be performed according to the second embodiment or the third embodiment. However, the resources representing all beams within a certain cell may neither belong to a single resource set nor belong to a single subset.

According to a fourth embodiment, the restriction of beam measurement and report is performed per cell.

The MAC CE according to a first sub-embodiment of the fourth embodiment applies to all possible CSI reporting settings configured for a UE (for a serving cell and for a BWP). So, the MAC CE according to the first sub-embodiment of the fourth embodiment does not need to contain a CSI Reporting Setting ID field. In particular, the MAC CE according to the first sub-embodiment of the fourth embodiment has a variable size and consists of the following fields as illustrated in FIG. 3.

Serving Cell ID: This field indicates the identity of the Serving Cell for which the MAC CE applies. The length of the field is 5 bits;

BWP ID: This field indicates a DL BWP for which the MAC CE applies. The length of the BWP ID field is 2 bits;

$P_i$: Each $P_i$ field indicates the activation or deactivation status of all channel measurement resources associated with the $(i+1)^{th}$ PCID, where each of the neighboring cells configured in the measurement object (MO) for the UE in the serving cell is associated with a different PCID value. For example, $P_0$ indicates all channel measurement resources associated with the neighboring cell that has the lowest PCID value; $P_1$ indicates all channel measurement resources associated with the neighboring cell that has the second lowest PCID value; and so on. The $P_i$ field is set to 1 to indicate that the channel measurement resources associated with the PCID indicated by the $P_i$ field shall be activated. The $P_i$ field is set to 0 to indicate that the channel measurement resources associated with the PCID indicated by the $P_i$ field shall be deactivated. The length of the bitmap of the $P_i$ field is determined by the number of neighboring cells configured in the MO for the UE in the serving cell.

When a UE receives a MAC CE according to the first sub-embodiment of the fourth embodiment, all channel measurement resources associated with the PCID indicated by $P_i$ field(s) set to 0 configured in all channel measurement resource sets (e.g. NZP CSI-RS resource sets or CSI-SSB-Resource sets) for all CSI reporting settings shall be deactivated, and the CRI(s) or SSBRI(s) indicating the deactivated resource(s) are not allowed to be reported in the CSI report.

FIG. 4 illustrates an example of the first sub-embodiment of the fourth embodiment. A UE is configured with a MO containing 8 non-serving cells as neighboring cells with PCID values 18, 26, 38, 58, 88, 235, 512, and 567.

SSB-Resources #1-1~#1-64 are associated with PCID=18;

SSB-Resources #2-1~#2-64 are associated with PCID=26;

SSB-Resources #3-1~#3-64 are associated with PCID=38;

SSB-Resources #4-1~#4-64 are associated with PCID=58;

SSB-Resources #5-1~#5-64 are associated with PCID=88;

SSB-Resources #6-1~#6-64 are associated with PCID=235;

SSB-Resources #7-1~#7-64 are associated with PCID=512; and

SSB-Resources #8-1~#8-64 are associated with PCID=567.

CSI-SSB-Resource sets are configured as follows:

CSI-SSB-Resource set #1={SSB-Resource #3-1, SSB-Resource #3-2, SSB-Resource #3-3, SSB-Resource #3-4, SSB-Resource #3-5, SSB-Resource #3-6, SSB-Resource #3-7, SSB-Resource #3-8};

CSI-SSB-Resource set #2={SSB-Resource #1-1, SSB-Resource #1-2, SSB-Resource #1-3, SSB-Resource #1-4, SSB-Resource #3-1, SSB-Resource #3-2, SSB-Resource #3-3, SSB-Resource #3-4, SSB-Resource #5-1, SSB-Resource #5-2, SSB-Resource #5-3, SSB-Resource #5-4};

CSI-SSB-Resource set #3={SSB-Resource #3-5, SSB-Resource #3-6, SSB-Resource #3-7, SSB-Resource #3-8, SSB-Resource #6-1, SSB-Resource #6-2, SSB-Resource #6-3, SSB-Resource #6-4, SSB-Resource #8-1, SSB-Resource #8-2, SSB-Resource #8-3, SSB-Resource #8-4}; and CSI-SSB-Resource set #4={SSB-Resource #1-1, SSB-Resource #1-2, SSB-Resource #1-3, SSB-Resource #1-4, SSB-Resource #2-1, SSB-Resource #2-2, SSB-Resource #2-3, SSB-Resource #2-4, SSB-Resource #3-1, SSB-Resource #3-2, SSB-Resource #3-3, SSB-Resource #3-4}.

If the UE receives a MAC CE as illustrated in FIG. 4, since $P_2=0$, all channel measurement resources (e.g. SSB-Resources) associated with the cell that has the $3^{rd}$ lowest PCID value (i.e. PCID=38) shall be deactivated. That is, SSB-Resources #3-1~#3-64 are deactivated. In particular, any of SSB-Resources #3-1~#3-64 contained in the CSI-SSB-Resource sets #1, #2, #3 and #4 are deactivated.

For CSI-Report #1 associated with CSI-SSB-Resource set #1, all resources (i.e. SSB-Resource #3-1, SSB-Resource #3-2, SSB-Resource #3-3, SSB-Resource #3-4, SSB-Resource #3-5, SSB-Resource #3-6, SSB-Resource #3-7, SSB-Resource #3-8) are deactivated and any SSBRI value is not allowed to be reported.

For CSI-Report #2 associated with CSI-SSB-Resource set #2, SSBRI with values 4, 5, 6, 7 (i.e. indicating SSB-Resource #3-1, SSB-Resource #3-2, SSB-Resource #3-3, SSB-Resource #3-4) are not allowed to be reported.

For CSI-Report #3 associated with CSI-SSB-Resource set #3, SSBRI with values 0, 1, 2, 3 (i.e. indicating SSB-Resource #3-5, SSB-Resource #3-6, SSB-Resource #3-7, SSB-Resource #3-8) are not allowed to be reported.

For CSI-Report #4 associated with CSI-SSB-Resource set #4, SSBRI with values 8, 9, 10, 11 (i.e. indicating SSB-Resource #3-1, SSB-Resource #3-2, SSB-Resource #3-3, SSB-Resource #3-4) are not allowed to be reported.

The MAC CE according to a second sub-embodiment of the fourth embodiment applies to certain cells for a certain CSI reporting setting indicated by a CSI Reporting Setting ID field as illustrated in FIG. 5.

The MAC CE according to the second sub-embodiment of the fourth embodiment differs from the MAC CE according to the first sub-embodiment of the fourth embodiment in that a CSI Reporting Setting ID field is added, and an optional "Aperiodic Trigger State ID" field is added. The Aperiodic Triggering State ID field only exists for the case that the indicated CSI reporting setting is for aperiodic CSI report.

Each $P_i$ field indicates the activation or deactivation status of all channel measurement resources associated with the $(i+1)^{th}$ PCID associated with the CSI reporting setting indicated by the CSI Reporting Setting ID field. If the Aperiodic Triggering State ID field exists, the Pi field indicates the activation or deactivation status of all channel measurement resources associated with the $(i+1)^{th}$ PCID within the channel measurement resource set(s) indicated by the Aperiodic Triggering State ID field in the CSI reporting setting indicated by the CSI Reporting Setting ID field. The length of the bitmap of $P_i$ fields is determined by the number of PCID values associated with all the channel measurement resources in the CSI reporting setting indicated by the CSI Reporting Setting ID field.

FIG. 6 illustrates an example of the second sub-embodiment of the fourth embodiment. A UE is configured with a periodic CSI reporting setting with CSI-ReportConfig=19 (i.e. '010011') and with reportQuantity set to 'ssb-index- RSRP'. A CSI-SSB-ResourceSet consisting of 64 SSB resources (e.g. SSB-Resources #0~#63) is configured for channel measurement.

SSB-Resources #0~#7 are associated with PCID=26,
SSB-Resources #8~#15 are associated with PCID=38,
SSB-Resources #16~#23 are associated with PCID=58,
SSB-Resources #24~#31 are associated with PCID=88,
SSB-Resources #32~#39 are associated with PCID=235,
SSB-Resources #40~#47 are associated with PCID=512,
SSB-Resources #48~#55 are associated with PCID=567,
SSB-Resources #56~#63 are associated with PCID=867

If the UE receives a MAC CE as illustrated in FIG. 6, since $P_2$=0 and $P_5$=0, all channel measurement resources (e.g. SSB-Resources) associated with the cell that has the 3$^{rd}$ lowest PCID value (i.e. PCID value=58) and the 6$^{th}$ lowest PCID value (i.e. PCID value=512) shall be deactivated. In particular, SSBRI with values k=16~23 and 40~47 are not allowed to be reported in the corresponding CSI report.

In all of the above embodiments, the restriction is applied to the channel measurement resources. On the other hand, NZP CSI-RS based interference measurement is supported for SINR calculation for L1-SINR, PMI and CQI report, where each resource (i.e. interference measurement resource) in the resource setting for interference is associated with a resource (i.e. channel measurement resource) in the resource setting for channel measurement. In other words, each interference measurement resource is one-to-one associated with one channel measurement resource.

According to a fifth embodiment, when one Resource Setting is configured for channel and interference measurement for L1-SINR computation, or when two Resource Settings are configured in which one Resource Setting is for channel measurement and another Resource Setting is for interference measurement performed on CSI-IM or on NZP CSI-RS, or when three Resource Settings are configured in which a first Resource Setting is for channel measurement, a second Resource Setting is for CSI-IM based interference measurement and a third Resource Setting is for NZP CSI-RS based interference measurement, in the condition that channel measurement resource(s) are restricted according to any of the first to the fourth embodiment, the interference measurement resource(s) that are one-by-one associated with the restricted channel measurement resource(s) are also restricted.

That is, when the UE reports a CSI report according to a CSI reporting setting associated with a resource setting while the RRC parameter reportQuantity is set to 'cri-SINR' or 'ssb-Index-SINR' (which means that one or more CRI(s) or SSBRI(s) and the measured L1-SINR values of the NZP CSI-RS resource(s) or SSB resource(s) indicated by the one or more CRI(s) or SSBRI(s) are reported in a CSI report), if the MAC CE according to any of the first embodiment to the fourth embodiment was previously received, in addition to the deactivated channel measurement resources being not required to be measured and not allowed to be reported, each of the interference measurement resources that is one-by-one associated with each of the restricted channel measurement resources is also restricted (i.e. being not required to be measured and not allowed to be reported).

A sixth embodiment relates to how to count and report the CRI or SSBRI in consideration of the impact of the restricted resource(s).

For example, FIG. 7 illustrates an MAC CE example according to the first sub-embodiment of the first embodiment. This MAC CE applies to the CSI reporting setting configured with CSI-ReportConfigId=19 (i.e. '010011') which may be a periodic or a semi-persistent CSI reporting setting. One channel measurement resource set consisting of 16 channel measurement resources is configured in the resource setting for channel measurement. This MAC CE ($S_8$=0, $S_9$=0, $S_{10}$=0, $S_{11}$=0) implies that the 9$^{th}$, 10$^{th}$, 11$^{th}$, and 12$^{th}$ channel measurement resources (e.g. NZP CSI-RS resources indicated by CRIs or SSB resources indicated by SSBRIs) within the channel measurement resource set are deactivated and are not required to be measured.

According to a first sub-embodiment of the sixth embodiment, the CRI or SSBRI with value k indicating the resources which are deactivated are not allowed to be reported, and the bit width of the reported CRI or SSBRI is still determined by $\lceil \log_2(K_s) \rceil$ (which means the smallest integer that is equal to or larger than $\log_2(K_s)$), in which $K_s$ is the total number of channel measurement resources within the channel measurement resource set(s). In the example of FIG. 7, CRI or SSBRI with values k=8, 9, 10, and 11 are not allowed to be reported in the corresponding CSI report. In other words, the allowed values of k are 0 to 7 and 12 to 15.

According to a second sub-embodiment of the sixth embodiment, the CRI or SSBRI with value k only indicate the resources which are activated, and the bit width of the reported CRI or SSBRI is determined by $\lceil \log_2(K_{DS}) \rceil$ (which means the smallest integer that is equal to or larger than $\log_2(K_{DS})$), in which $K_{DS}$ is the number of activated channel measurement resources within the channel measurement resource set(s). CRI or SSBRI k (k≥0) indicates the activated (k+1)$^{th}$ channel measurement resource. In the example of FIG. 7, CRI or SSBRI 0 indicates the 1$^{st}$ channel measurement resource, CRI or SSBRI 1 indicates the 2$^{nd}$ channel measurement resource, CRI or SSBRI 2 indicates the 3$^{rd}$ channel measurement resource, CRI or SSBRI 3 indicates the 4$^{th}$ channel measurement resource, CRI or SSBRI 4 indicates the 5$^{th}$ channel measurement resource, CRI or SSBRI 5 indicates the 6$^{th}$ channel measurement resource, CRI or SSBRI 6 indicates the 7$^{th}$ channel measurement resource, CRI or SSBRI 7 indicates the 8$^{th}$ channel measurement resource, while CRI or SSBRI 8 indicates the 13$^{th}$ channel measurement resource, CRI or SSBRI 9 indicates the 14$^{th}$ channel measurement resource, CRI or SSBRI 10 indicates the 15$^{th}$ channel measurement resource and CRI or SSBRI 11 indicates the 16$^{th}$ channel measurement resource. As a whole, only CRI or SSBRI with value range 0~11 can be reported the UE. That is, the allowed values of k are 0 to 11.

FIG. 8 is a schematic flow chart diagram illustrating an embodiment of a method 800 according to the present application. In some embodiments, the method 800 is performed by an apparatus, such as a remote unit (UE). In certain embodiments, the method 800 may be performed by a processor executing program code, for example, a microcontroller, a microprocessor, a CPU, a GPU, an auxiliary processing unit, a FPGA, or the like.

The method 800 may include 802 receiving a MAC CE to activate or deactivate resource(s) configured for the UE for channel measurement; and 804 determining CRI or SSBRI values that are not allowed to be reported in a CSI report according to the resource(s) deactivated by the MAC CE.

In one embodiment, the MAC CE contains a CSI Reporting setting ID field indicating a CSI reporting setting for the CSI report, and the resources are configured in a resource setting for channel measurement associated with the CSI reporting setting for the CSI report. The MAC CE may further contain a bitmap to indicate the activation or deactivation status of the resources or resource sets or resource subsets configured in the resource setting for channel measurement.

If one or more resource sets, each of which contains a plurality of resources, are configured in the resource setting for channel measurement for the CSI report that is a periodic or semi-persistent CSI report, each bit of the bitmap indicates the activation or deactivation status of a different resource within the one or more resource sets. The length of the bitmap is determined by the number of resources within the one or more resource sets.

If multiple resource sets, each of which contains a plurality of resources, are configured in the resource setting for channel measurement for the CSI report that is an aperiodic CSI report, each bit indicates the activation or deactivation status for a different resource within one or more resource sets among the multiple resource sets; and the MAC CE further contains an Aperiodic Trigger State ID field indicating the one or more resource sets. The length of the bitmap is determined by the number of resources within the one or more resource sets.

If multiple resource sets, each of which contains a plurality of resources, are configured in the resource setting for channel measurement, each bit of the bitmap indicates the activation or deactivation status of all resources within a different resource set. The length of the bitmap is determined by the number of the multiple resource sets.

If one or more resource sets, each of which contains multiple subsets each of which contains a plurality of resources, are configured in the resource setting for channel measurement for the CSI report that is a periodic or semi-persistent CSI report, each bit of the bitmap indicates the activation or deactivation status of all resources within a different subset. The length of the bitmap is determined by the number of the subsets within the one or more resource sets.

If multiple resource sets each of which contains multiple subsets each of which contains a plurality of resources are configured in the resource setting for channel measurement for the CSI report that is an aperiodic CSI report, each bit of the bitmap indicates the activation or deactivation status of all resources within a different subset within one or more resource sets among the multiple resource sets, and the MAC CE further contains an Aperiodic Trigger State ID field indicating the one or more resource sets. The length of the bitmap is determined by the number of the subsets within the one or more resource sets.

In another embodiment, the MAC CE contains a bitmap, and each bit of the bitmap indicates the activation or deactivation status of all resources associated with a different non-serving PCID. The MAC CE may further contain a CSI Reporting setting ID field indicating a CSI reporting setting for the CSI report, and the resources are configured in a resource setting for channel measurement associated with the CSI reporting setting for the CSI report.

In some embodiment, the resource(s) configured for the UE for interference measurement, each of which is one-by-one associated with one resource configured for the UE for channel measurement, are also activated or deactivated by the MAC CE.

In some embodiment, the bit width of the reported CRI or SSBRI in the CSI report is determined by the smallest integer that is equal to or larger than $\log_2(K_{DS})$, in which $K_{DS}$ is the number of activated resources.

Figure 9:
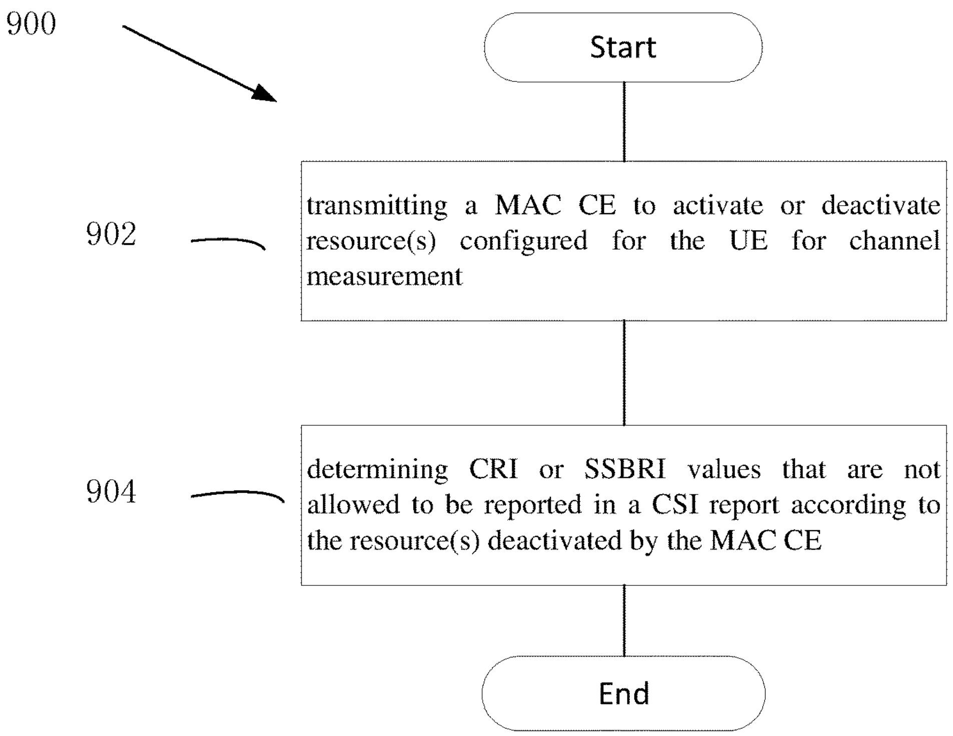
FIG. 9 is a schematic flow chart diagram illustrating a further embodiment of a method.

FIG. 9 is a schematic flow chart diagram illustrating a further embodiment of a method 900 according to the present application. In some embodiments, the method 900 is performed by an apparatus, such as a base unit. In certain embodiments, the method 900 may be performed by a processor executing program code, for example, a microcontroller, a microprocessor, a CPU, a GPU, an auxiliary processing unit, a FPGA, or the like.

The method 900 may include 902 transmitting a MAC CE to activate or deactivate resource(s) configured for the UE for channel measurement; and 904 determining CRI or SSBRI values that are not allowed to be reported in a CSI report according to the resource(s) deactivated by the MAC CE.

In one embodiment, the MAC CE contains a CSI Reporting setting ID field indicating a CSI reporting setting for the CSI report, and the resources are configured in a resource setting for channel measurement associated with the CSI reporting setting for the CSI report. The MAC CE may further contain a bitmap to indicate the activation or deactivation status of the resources or resource sets or resource subsets configured in the resource setting for channel measurement.

If one or more resource sets, each of which contains a plurality of resources, are configured in the resource setting for channel measurement for the CSI report that is a periodic or semi-persistent CSI report, each bit of the bitmap indicates the activation or deactivation status of a different resource within the one or more resource sets. The length of the bitmap is determined by the number of resources within the one or more resource sets.

If multiple resource sets, each of which contains a plurality of resources, are configured in the resource setting for channel measurement for the CSI report that is an aperiodic CSI report, each bit indicates the activation or deactivation status for a different resource within one or more resource sets among the multiple resource sets; and the MAC CE further contains an Aperiodic Trigger State ID field indicating the one or more resource sets. The length of the bitmap is determined by the number of resources within the one or more resource sets.

If multiple resource sets, each of which contains a plurality of resources, are configured in the resource setting for channel measurement, each bit of the bitmap indicates the activation or deactivation status of all resources within a different resource set. The length of the bitmap is determined by the number of the multiple resource sets.

If one or more resource sets, each of which contains multiple subsets each of which contains a plurality of resources, are configured in the resource setting for channel measurement for the CSI report that is a periodic or semi-persistent CSI report, each bit of the bitmap indicates the activation or deactivation status of all resources within a different subset. The length of the bitmap is determined by the number of the subsets within the one or more resource sets.

If multiple resource sets each of which contains multiple subsets each of which contains a plurality of resources are configured in the resource setting for channel measurement for the CSI report that is an aperiodic CSI report, each bit of the bitmap indicates the activation or deactivation status of all resources within a different subset within one or more resource sets among the multiple resource sets, and the MAC CE further contains an Aperiodic Trigger State ID field indicating the one or more resource sets. The length of the bitmap is determined by the number of the subsets within the one or more resource sets.

In another embodiment, the MAC CE contains a bitmap, and each bit of the bitmap indicates the activation or deactivation status of all resources associated with a different non-serving PCID. The MAC CE may further contain a CSI Reporting setting ID field indicating a CSI reporting setting for the CSI report, and the resources are configured in a resource setting for channel measurement associated with the CSI reporting setting for the CSI report.

In some embodiment, the resource(s) configured for the UE for interference measurement, each of which is one-by-one associated with one resource configured for the UE for channel measurement, are also activated or deactivated by the MAC CE.

In some embodiment, the bit width of the reported CRI or SSBRI in the CSI report is determined by the smallest integer that is equal to or larger than $\log_2(K_{DS})$, in which $K_{DS}$ is the number of activated resources.

Figure 10:
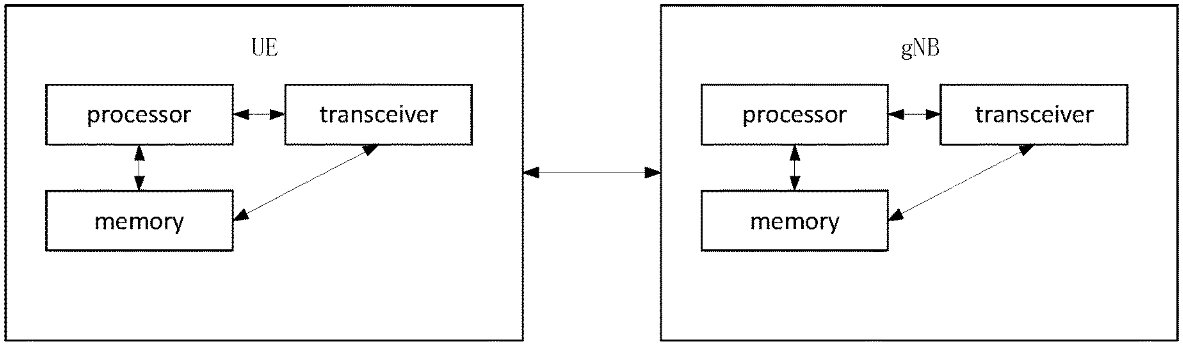
FIG. 10 is a schematic block diagram illustrating apparatuses according to one embodiment.

FIG. 10 is a schematic block diagram illustrating apparatuses according to one embodiment.

Referring to FIG. 10, the UE (i.e. the remote unit) includes a processor, a memory, and a transceiver. The processor implements a function, a process, and/or a method which are proposed in FIG. 8.

The UE comprises a receiver that receives a MAC CE to activate or deactivate resource(s) configured for the UE for channel measurement; and a processor that determines CRI or SSBRI values that are not allowed to be reported in a CSI report according to the resource(s) deactivated by the MAC CE.

In one embodiment, the MAC CE contains a CSI Reporting setting ID field indicating a CSI reporting setting for the CSI report, and the resources are configured in a resource setting for channel measurement associated with the CSI reporting setting for the CSI report. The MAC CE may further contain a bitmap to indicate the activation or deactivation status of the resources or resource sets or resource subsets configured in the resource setting for channel measurement.

If one or more resource sets, each of which contains a plurality of resources, are configured in the resource setting for channel measurement for the CSI report that is a periodic or semi-persistent CSI report, each bit of the bitmap indicates the activation or deactivation status of a different resource within the one or more resource sets. The length of the bitmap is determined by the number of resources within the one or more resource sets.

If multiple resource sets, each of which contains a plurality of resources, are configured in the resource setting for channel measurement for the CSI report that is an aperiodic CSI report, each bit indicates the activation or deactivation status for a different resource within one or more resource sets among the multiple resource sets; and the MAC CE further contains an Aperiodic Trigger State ID field indicating the one or more resource sets. The length of the bitmap is determined by the number of resources within the one or more resource sets.

If multiple resource sets, each of which contains a plurality of resources, are configured in the resource setting for channel measurement, each bit of the bitmap indicates the activation or deactivation status of all resources within a different resource set. The length of the bitmap is determined by the number of the multiple resource sets.

If one or more resource sets, each of which contains multiple subsets each of which contains a plurality of resources, are configured in the resource setting for channel measurement for the CSI report that is a periodic or semi-persistent CSI report, each bit of the bitmap indicates the activation or deactivation status of all resources within a different subset. The length of the bitmap is determined by the number of the subsets within the one or more resource sets.

If multiple resource sets each of which contains multiple subsets each of which contains a plurality of resources are configured in the resource setting for channel measurement for the CSI report that is an aperiodic CSI report, each bit of the bitmap indicates the activation or deactivation status of all resources within a different subset within one or more resource sets among the multiple resource sets, and the MAC CE further contains an Aperiodic Trigger State ID field indicating the one or more resource sets. The length of the bitmap is determined by the number of the subsets within the one or more resource sets.

In another embodiment, the MAC CE contains a bitmap, and each bit of the bitmap indicates the activation or deactivation status of all resources associated with a different non-serving PCID. The MAC CE may further contain a CSI Reporting setting ID field indicating a CSI reporting setting for the CSI report, and the resources are configured in a resource setting for channel measurement associated with the CSI reporting setting for the CSI report.

In some embodiment, the resource(s) configured for the UE for interference measurement, each of which is one-by-one associated with one resource configured for the UE for channel measurement, are also activated or deactivated by the MAC CE.

In some embodiment, the bit width of the reported CRI or SSBRI in the CSI report is determined by the smallest integer that is equal to or larger than $\log_2(K_{DS})$, in which $K_{DS}$ is the number of activated resources.

Referring to FIG. 10, the gNB (i.e. base unit) includes a processor, a memory, and a transceiver. The processors implement a function, a process, and/or a method which are proposed in FIG. 9.

The base unit comprises a transmitter that transmits a MAC CE to activate or deactivate resource(s) configured for the UE for channel measurement; and a processor that determines CRI or SSBRI values that are not allowed to be reported in a CSI report according to the resource(s) deactivated by the MAC CE.

In one embodiment, the MAC CE contains a CSI Reporting setting ID field indicating a CSI reporting setting for the CSI report, and the resources are configured in a resource setting for channel measurement associated with the CSI reporting setting for the CSI report. The MAC CE may further contain a bitmap to indicate the activation or deactivation status of the resources or resource sets or resource subsets configured in the resource setting for channel measurement.

If one or more resource sets, each of which contains a plurality of resources, are configured in the resource setting for channel measurement for the CSI report that is a periodic or semi-persistent CSI report, each bit of the bitmap indicates the activation or deactivation status of a different resource within the one or more resource sets. The length of the bitmap is determined by the number of resources within the one or more resource sets.

If multiple resource sets, each of which contains a plurality of resources, are configured in the resource setting for channel measurement for the CSI report that is an aperiodic CSI report, each bit indicates the activation or deactivation status for a different resource within one or more resource sets among the multiple resource sets; and the MAC CE further contains an Aperiodic Trigger State ID field indicating the one or more resource sets. The length of the bitmap is determined by the number of resources within the one or more resource sets.

If multiple resource sets, each of which contains a plurality of resources, are configured in the resource setting for channel measurement, each bit of the bitmap indicates the activation or deactivation status of all resources within a different resource set. The length of the bitmap is determined by the number of the multiple resource sets.

If one or more resource sets, each of which contains multiple subsets each of which contains a plurality of resources, are configured in the resource setting for channel measurement for the CSI report that is a periodic or semi-persistent CSI report, each bit of the bitmap indicates the activation or deactivation status of all resources within a different subset. The length of the bitmap is determined by the number of the subsets within the one or more resource sets.

If multiple resource sets each of which contains multiple subsets each of which contains a plurality of resources are configured in the resource setting for channel measurement for the CSI report that is an aperiodic CSI report, each bit of the bitmap indicates the activation or deactivation status of all resources within a different subset within one or more resource sets among the multiple resource sets, and the MAC CE further contains an Aperiodic Trigger State ID field indicating the one or more resource sets. The length of the bitmap is determined by the number of the subsets within the one or more resource sets.

In another embodiment, the MAC CE contains a bitmap, and each bit of the bitmap indicates the activation or deactivation status of all resources associated with a different non-serving PCID. The MAC CE may further contain a CSI Reporting setting ID field indicating a CSI reporting setting for the CSI report, and the resources are configured in a resource setting for channel measurement associated with the CSI reporting setting for the CSI report.

In some embodiment, the resource(s) configured for the UE for interference measurement, each of which is one-by-one associated with one resource configured for the UE for channel measurement, are also activated or deactivated by the MAC CE.

In some embodiment, the bit width of the reported CRI or SSBRI in the CSI report is determined by the smallest integer that is equal to or larger than $\log_2(K_{DS})$, in which $K_{DS}$ is the number of activated resources.

Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

receiving a medium access control (MAC) control element (CE) to activate or deactivate channel measurement resource(s) that are radio resource control (RRC)-configured for the UE for beam measurement and reporting, wherein the channel measurement resource(s) deactivated by the MAC CE are not required to be measured; and determining channel state information reference signal resource indicator (CRI) or secondary synchronization signal/physical broadcast channel block resource indicator (SSBRI) values that are not allowed to be reported in a channel state information (CSI) report according to the channel measurement resource(s) deactivated by the MAC CE, wherein the CRI or SSBRI values that are not allowed to be reported correspond to the deactivated channel measurement resource(s) regardless of whether a reference signal is transmitted on those resources.

2. The method of claim 1, wherein:

the MAC CE contains a CSI reporting setting identifier (ID) field indicating a CSI reporting setting for the CSI report; and the resources are configured in a resource setting for channel measurement associated with the CSI reporting setting for the CSI report.

3. The method of claim 2, wherein the MAC CE further contains a bitmap to indicate an activation or deactivation status of the resources or resource sets or resource subsets configured in the resource setting for channel measurement.

4. The method of claim 3, wherein:

if one or more resource sets, each of which contains a plurality of resources, are configured in the resource setting for channel measurement for the CSI report that is a periodic or semi-persistent CSI report, each bit of the bitmap indicates the activation or deactivation status of a different resource within the one or more resource sets; and a length of the bitmap is determined by a number of resources within the one or more resource sets.

5. The method of claim 3, wherein:

if multiple resource sets, each of which contains a plurality of resources, are configured in the resource setting for channel measurement for the CSI report that is an aperiodic CSI report, each bit indicates the activation or deactivation status for a different resource within one or more resource sets among the multiple resource sets;

the MAC CE further contains an Aperiodic Trigger State identifier (ID) field indicating the one or more resource sets; and a length of the bitmap is determined by a number of resources within the one or more resource sets.

6. The method of claim 3, wherein:

if multiple resource sets, each of which contains a plurality of resources, are configured in the resource setting for channel measurement, each bit of the bitmap indicates the activation or deactivation status of all resources within a different resource set; and a length of the bitmap is determined by a number of the multiple resource sets.

7. The method of claim 3, wherein:

if one or more resource sets, each of which contains multiple subsets each of which contains a plurality of resources, are configured in the resource setting for channel measurement for the CSI report that is a periodic or semi-persistent CSI report, each bit of the bitmap indicates the activation or deactivation status of all resources within a different subset; and a length of the bitmap is determined by a number of the subsets within the one or more resource sets.

8. The method of claim 3, wherein:

if multiple resource sets each of which contains multiple subsets each of which contains a plurality of resources are configured in the resource setting for channel measurement for the CSI report that is an aperiodic CSI report, each bit of the bitmap indicates the activation or deactivation status of all resources within a different subset within one or more resource sets among the multiple resource sets;

the MAC CE further contains an Aperiodic Trigger State identifier (ID) field indicating the one or more resource sets; and a length of the bitmap is determined by a number of the subsets within the one or more resource sets.

9. The method of claim 1, wherein:

the MAC CE contains a bitmap; and each bit of the bitmap indicates an activation or deactivation status of all resources associated with a different non-serving physical cell identifier (PCID).

10. The method of claim 9, wherein:

the MAC CE further contains a CSI Reporting setting identifier (ID) field indicating a CSI reporting setting for the CSI report; and the resources are configured in a resource setting for channel measurement associated with the CSI reporting setting for the CSI report.

11. The method of claim 1, wherein the resource(s) configured for the UE for interference measurement, each of which is one-by-one associated with one resource configured for the UE for channel measurement, are also activated or deactivated by the MAC CE.

12. The method of claim 1, wherein a bit width of the CRI or SSBRI in the CSI report is determined by a smallest integer that is equal to or larger than $\log_2(K_{DS})$, in which $K_{DS}$ is a number of activated resources.

13. A user equipment (UE), comprising:

at least one memory; and at least one processor coupled with the at least one memory and configured to cause the UE to:

receive a medium access control (MAC) control element (CE) to activate or deactivate channel measurement resource(s) that are radio resource control (RRC)-configured for the UE for beam measurement and reporting, wherein the channel measurement resource(s) deactivated by the MAC CE are not required to be measured; and determine channel state information reference signal resource indicator (CRI) or secondary synchronization signal/physical broadcast channel block resource indicator (SSBRI) values that are not allowed to be reported in a channel state information (CSI) report according to the channel measurement resource(s) deactivated by the MAC CE, wherein the CRI or SSBRI values that are not allowed to be reported correspond to the deactivated channel measurement resource(s) regardless of whether a reference signal is transmitted on those resources.

14. The UE of claim 13, wherein:

the MAC CE contains a CSI Reporting setting identifier (ID) field indicating a CSI reporting setting for the CSI report; and the resources are configured in a resource setting for channel measurement associated with the CSI reporting setting for the CSI report.

15. The UE of claim 14, wherein the MAC CE further contains a bitmap to indicate an activation or deactivation status of the resources or resource sets or resource subsets configured in the resource setting for channel measurement.

16. The UE of claim 15, wherein:

if one or more resource sets, each of which contains a plurality of resources, are configured in the resource setting for channel measurement for the CSI report that is a periodic or semi-persistent CSI report, each bit of the bitmap indicates the activation or deactivation status of a different resource within the one or more resource sets; and a length of the bitmap is determined by a number of resources within the one or more resource sets.

17. The UE of claim 15, wherein:

if multiple resource sets, each of which contains a plurality of resources, are configured in the resource setting for channel measurement for the CSI report that is an aperiodic CSI report, each bit indicates the activation or deactivation status for a different resource within one or more resource sets among the multiple resource sets;

the MAC CE further contains an Aperiodic Trigger State identifier (ID) field indicating the one or more resource sets; and a length of the bitmap is determined by a number of resources within the one or more resource sets.

18. The UE of claim 15, wherein:

if multiple resource sets, each of which contains a plurality of resources, are configured in the resource setting for channel measurement, each bit of the bitmap indicates the activation or deactivation status of all resources within a different resource set; and a length of the bitmap is determined by a number of the multiple resource sets.

19. A base station, comprising:

at least one memory; and at least one processor coupled with the at least one memory and configured to cause the base station to:

transmit a medium access control (MAC) control element (CE) to activate or deactivate channel measurement resource(s) that are radio resource control (RRC)-configured for a user equipment (UE) for beam measurement and reporting, wherein the channel measurement resource(s) deactivated by the MAC CE are not required to be measured; and determine channel state information reference signal resource indicator (CRI) or secondary synchronization signal/physical broadcast channel block resource indicator (SSBRI) values that are not allowed to be reported in a channel state information (CSI) report according to the channel measurement resource(s) deactivated by the MAC CE, wherein the CRI or SSBRI values that are not allowed to be reported correspond to the deactivated channel measurement resource(s) regardless of whether a reference signal is transmitted on those resources.

20. A method performed by a base station, comprising:

transmitting a medium access control (MAC) control element (CE) to activate or deactivate channel measurement resource(s) that are radio resource control (RRC)-configured for a user equipment (UE) for beam measurement and reporting, wherein the channel measurement resource(s) deactivated by the MAC CE are not required to be measured; and determining channel state information reference signal resource indicator (CRI) or secondary synchronization signal/physical broadcast channel block resource indicator (SSBRI) values that are not allowed to be reported in a channel state information (CSI) report according to the channel measurement resource(s) deactivated by the MAC CE, wherein the CRI or SSBRI values that are not allowed to be reported correspond to the deactivated channel measurement resource(s) regardless of whether a reference signal is transmitted on those resources.

* * * * *